United States Patent
Fields et al.

(10) Patent No.: US 10,024,971 B2
(45) Date of Patent: Jul. 17, 2018

(54) APPARATUS, SYSTEM AND METHOD FOR LOCATING A LOST INSTRUMENT OR OBJECT

(71) Applicants: Walter Fields, St. Louis Park, MN (US); Donald Michael Shields, St. Paul, MN (US)

(72) Inventors: Walter Fields, St. Louis Park, MN (US); Donald Michael Shields, St. Paul, MN (US)

(*) Notice: Subject to any disclaimer, the term of this patent is extended or adjusted under 35 U.S.C. 154(b) by 971 days.

(21) Appl. No.: 14/051,024

(22) Filed: Oct. 10, 2013

(65) Prior Publication Data

US 2015/0022396 A1 Jan. 22, 2015

Related U.S. Application Data

(60) Provisional application No. 61/846,987, filed on Jul. 16, 2013.

(51) Int. Cl.

| | |
|---|---|
| *G01S 19/16* | (2010.01) |
| *G08B 13/14* | (2006.01) |
| *G01S 19/49* | (2010.01) |
| *G01S 19/41* | (2010.01) |
| *G01S 5/00* | (2006.01) |
| *G01S 5/02* | (2010.01) |
| *G01S 19/00* | (2010.01) |

(52) U.S. Cl.
CPC ............ *G01S 19/16* (2013.01); *G01S 5/0027* (2013.01); *G01S 5/02* (2013.01); *G01S 19/41* (2013.01); *G01S 19/49* (2013.01); *G08B 13/1436* (2013.01)

(58) Field of Classification Search
CPC .... G08B 13/02; G08B 13/14; G08B 13/1436; G08B 21/02; G08B 21/0202; G08B 21/028; G08B 25/02; G08B 25/10; G01S 5/0009; G01S 5/0018; G01S 5/0027; G01S 5/02; G01S 19/01; G01S 19/13; G01S 19/14; G01S 19/16; G01S 19/38; G01S 19/39; G01S 19/40; G01S 19/41; G01S 19/42; G01S 19/48; G01S 19/49; G01S 5/04; G01S 19/17; G01S 19/18; B60R 25/00; B60R 25/10; B60R 25/102; G08G 1/20; G08G 1/205; G06F 1/16; G06F 1/1613; G06F 1/1626; G06F 21/70; G06F 21/71; H04W 4/02; B64D 27/24
See application file for complete search history.

(56) References Cited

U.S. PATENT DOCUMENTS

| | | | | |
|---|---|---|---|---|
| 4,177,466 A | * | 12/1979 | Reagan | ..... G01S 5/04 340/426.16 |
| 4,697,761 A | * | 10/1987 | Long | ..... B64D 27/24 244/45 R |
| 4,818,998 A | * | 4/1989 | Apsell | ..... G01S 5/02 340/426.15 |

(Continued)

*Primary Examiner* — Bernarr E Gregory
(74) *Attorney, Agent, or Firm* — Billion & Armitage; Richard E. Billion

(57) ABSTRACT

A locatable object includes a microprocessor for operating the object, and a memory for storing at least a first position and a second position. The locatable object also includes an instrument recovery system integrated into the object. The instrument recovery system further includes a receiver for determining the location of an object, and a communications device for communicating at least the second position to another system.

17 Claims, 6 Drawing Sheets

(56) References Cited

U.S. PATENT DOCUMENTS

| | | | | |
|---|---|---|---|---|
| 4,908,629 A * | 3/1990 | Apsell | G01S 5/02 340/426.15 |
| 5,418,537 A * | 5/1995 | Bird | G01S 19/17 342/357.55 |
| 5,515,285 A * | 5/1996 | Garrett, Sr. | B60R 25/102 340/426.2 |
| 5,917,423 A * | 6/1999 | Duvall | B60R 25/102 340/10.1 |
| 5,969,433 A * | 10/1999 | Maggiora | B60R 25/102 180/287 |
| 6,025,774 A * | 2/2000 | Forbes | B60R 25/00 235/384 |
| 6,141,652 A | 10/2000 | Reeder | |
| 6,362,736 B1 | 3/2002 | Gehlot | |
| 6,448,928 B1 * | 9/2002 | Knox et al. | G01S 19/16 |
| 6,816,090 B2 * | 11/2004 | Teckchandani | B60R 25/102 340/539.13 |
| 6,975,941 B1 * | 12/2005 | Lau | G01S 19/42 340/539.13 |
| 6,977,612 B1 * | 12/2005 | Bennett | G01S 19/48 342/357.46 |
| 7,106,211 B2 * | 9/2006 | Duvall | G08G 1/205 340/426.1 |
| 7,187,278 B2 * | 3/2007 | Biffar | G08G 1/20 340/426.19 |
| 7,315,925 B2 | 1/2008 | Takaragi | |
| 7,346,439 B2 * | 3/2008 | Bodin | G08G 1/205 307/10.3 |
| 7,366,522 B2 * | 4/2008 | Thomas | H04W 4/02 340/539.13 |
| 7,460,866 B2 | 12/2008 | Salkini et al. | |
| 7,498,985 B1 | 3/2009 | Woo et al. | |
| 7,536,169 B2 * | 5/2009 | Duvall | G01S 19/16 340/436 |
| 7,561,102 B2 * | 7/2009 | Duvall | G01S 5/02 340/426.19 |
| 7,702,460 B2 * | 4/2010 | Liu | G01S 19/18 342/357.31 |
| 7,728,724 B1 * | 6/2010 | Scalisi | G01S 19/16 340/539.1 |
| 7,818,803 B2 * | 10/2010 | Gordon | G06F 21/71 380/247 |
| 7,973,649 B2 * | 7/2011 | DeMille | B60R 25/10 307/10.2 |
| 8,013,735 B2 * | 9/2011 | Arpin | G08G 1/205 340/426.19 |
| 8,035,532 B2 | 10/2011 | Vosz | |
| 8,044,796 B1 | 10/2011 | Carr, Sr. | |
| 8,169,328 B2 * | 5/2012 | Duvall | G08B 21/028 340/539.13 |
| 8,427,305 B2 * | 4/2013 | Madsen et al. | G01S 19/16 |
| 8,477,011 B2 | 7/2013 | Tubb et al. | |
| 2002/0099503 A1 | 7/2002 | Mishra et al. | |
| 2002/0140543 A1 | 10/2002 | Chang | |
| 2003/0001775 A1 | 1/2003 | Turner | |
| 2003/0151507 A1 * | 8/2003 | Andre | G08B 25/10 340/539.13 |
| 2005/0219796 A1 | 10/2005 | Narendra et al. | |
| 2005/0261832 A1 * | 11/2005 | Arnouse | G08G 1/20 701/469 |
| 2006/0195261 A1 * | 8/2006 | Riley | G06F 1/1626 701/469 |
| 2007/0069869 A1 * | 3/2007 | Arnold | G08G 1/205 340/425.5 |
| 2008/0010015 A1 | 1/2008 | Luke et al. | |
| 2009/0009283 A1 | 1/2009 | Arts | |
| 2009/0150118 A1 | 6/2009 | Naima | |
| 2010/0071077 A1 | 3/2010 | Morris et al. | |
| 2011/0067064 A1 | 3/2011 | Karaoguz et al. | |

* cited by examiner

APPARATUS, SYSTEM AND METHOD FOR LOCATING A LOST INSTRUMENT OR OBJECT

CROSS-REFERENCE TO RELATED APPLICATION

This application claims the benefit of U.S. Provisional Patent Application No. 61/846,987 filed on 16 Jul. 2013, the contents of which are incorporated here by reference in their entirety.

TECHNICAL FIELD

Various embodiments described herein relate to an apparatus, system and method for locating a lost instrument or object.

BACKGROUND

For many years, there have been dramatic technological leaps made with respect to microprocessors. There have also been great strides made in manufacturing and producing microprocessors. For several years, the processing power of the current line of microprocessors was increasing dramatically. The increase in processing power resulted in speedier processors capable of doing more operations in a unit of time than the predecessor. Speed was also gained because of changes in architecture of the processors. Dual processors were used in computing devices. Sometimes quad processors were implemented in a single box so that tasks could be divided up and still more operations could be handled in a unit of time. These increases could also be termed as increases in processing power. These increases were a factor in increasing computer sales for several years. The increased processing power also allowed programmers to produce more complex programs. For example, video games became more lifelike as the processing power increased. The graphics on the next new game were always more lifelike than the last generation. New games would have to be bought by a consuming public that had a constant thirst for the latest and greatest games.

During this time processes for forming transistors and conductors on a circuit board also improved. Yields of microprocessors went up and the size of the microprocessors went down. During this time, the market price for earlier generation microprocessors dropped. One would think that the old microprocessors would be discontinued. However, the old microprocessor designs proved very reliable and there were many applications for these old generation microprocessors. This resulted in wide use of microprocessors. Microprocessors were used in autos to control speed, and to control the fuel to air mixture entering the combustion chamber. Today, a low end car has a cockpit that rivals the cockpits of some of the older airplanes. Microprocessors are pervasive. For example, it is not uncommon to have a microprocessor in a toaster. Microprocessors are also in many other consumer products, including televisions, stereos and the like. These products are feature rich and are desired by all.

Theft is another age old problem. When feature rich consumer products, instruments or other objects are present, thieves will take them. Losing objects and instruments is also an age old problem. In addition, sometimes, the instruments or objects can be misplaced or intentionally placed and then forgotten.

Over the past ten to fifteen years there has also been a huge growth in receivers that use the Global Positioning System ("GPS"). The GPS is a satellite-based navigation system made up of a network of about 30 satellites placed into orbit by the U.S. Department of Defense. GPS was originally intended for military applications, but in the 1980s, the government made the system available for civilian use. GPS works in any weather conditions, anywhere in the world, 24 hours a day. GPS satellites circle the earth twice a day in a very precise orbit and transmit signal information to earth. Using a microprocessor, GPS receivers take this information and use triangulation to calculate the user's exact location. Essentially, the GPS receiver compares the time a signal was transmitted by a satellite with the time it was received. The time difference tells the GPS receiver how far away the satellite is. With distance measurements from other satellites, the GPS receiver can determine the position of the GPS receiver. A GPS receiver must be locked on to the signal of at least three satellites to calculate a 2D position (latitude and longitude) and track movement. With four or more satellites in view, the receiver can determine the user's 3D position (latitude, longitude and altitude).

SUMMARY

A locatable object includes a microprocessor for operating the object, and a memory for storing at least a first position and a second position. The locatable object also includes an instrument recovery system integrated into the object. The instrument recovery system further includes a receiver for determining the location of an object, and a communications device for communicating at least the second position to another system. When moved to a second position, the owner would miss the instrument if it was illegitimate, such as a theft. The owner could then call the instrument and more specifically the communications device. The determined location would be communicated to the owner.

The communications device for communicating at least the second position delivers a message to a cell phone. The communications device for communicating at least the second position delivers a message to a network, in one embodiment. The network can be a wide area network, a local area network, a mesh network, a wireless network, a cellular network or the like. In other words, the communications device should be able to connect and communicate with a network and the network is not limited to those listed above. It should be noted that the communications device could connect to other networks.

A computerized method includes determining a position of an object using an instrument recovery system formed integrally with a motherboard of the object, and placing the determined position into memory. The determined position is compared to an original position. If a determined position is different from the original position, the determined position is communicated.

A machine-readable medium providing instructions that, when executed by a machine, cause the machine to perform operations include determining a position of an object using an instrument recovery system formed integrally with a motherboard of the object, and placing the determined position into memory. The determined position is compared to an original position and, if different the determined position is communicated.

DETAILED DESCRIPTION

Figure 1:
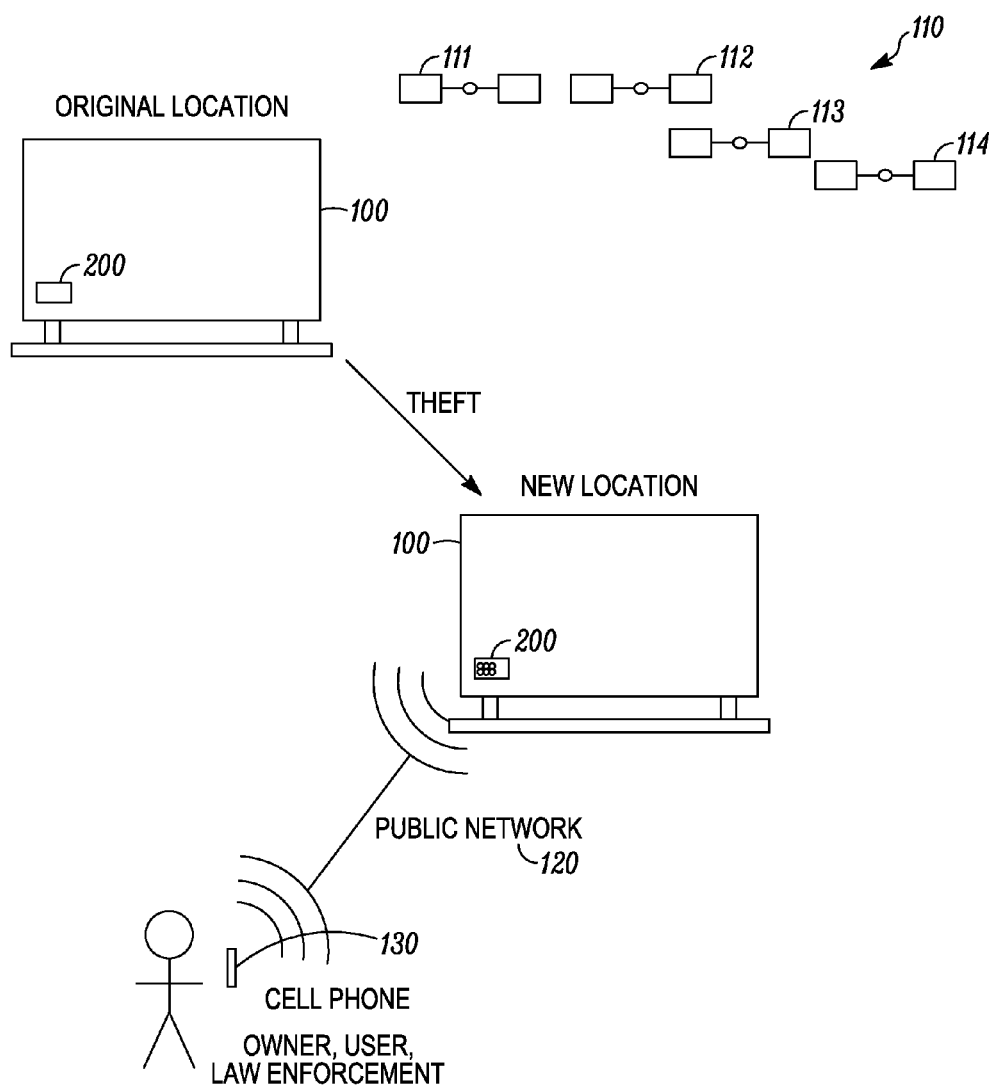
FIG. 1 is a schematic diagram of an object or instrument that includes an instrument recovery system, according to an example embodiment.

FIG. 1 is a schematic diagram of an object or instrument 100 that includes an instrument recovery system 200, according to an example embodiment. The instrument recovery system 200 has the capability of determining a new location or second location which is different from the first or original location. In one embodiment, the instrument recovery system 200 includes a receiver (shown in FIG. 2) for a Global Positioning System ("GPS"). The GPS 110 is represented as four satellites 111, 112, 113, 114. The GPS is a satellite-based navigation system made up of a network of about 30 satellites placed into orbit by the U.S. Department of Defense. GPS was originally intended for military applications, but in the 1980s, the government made the system available for civilian use. GPS works in any weather conditions, anywhere in the world, 24 hours a day. GPS satellites circle the earth twice a day in a very precise orbit and transmit signal information to earth. Using a microprocessor, GPS receivers take this information and use triangulation to calculate the user's exact location. The GPS receiver (shown in FIG. 2) compares the time a signal was transmitted by a satellite with the time it was received. The time difference tells the GPS receiver how far away the satellite is. With distance measurements from other satellites, the UPS receiver can determine the position of the GPS receivers A UPS receiver must be locked on to the signal of at least three satellites 1111, 112, 113 to calculate a 2D position (latitude and longitude) and track movement. With four 111, 112, 113, 114 or more satellites in view, the receiver can determine the user's 3D position (latitude, longitude and altitude).

The instrument recovery system 200 also includes a communications device (shown in FIG. 2) that can hook up to a public network 120. The communications device (shown in FIG. 2), in one embodiment, can hook or communicatively couple the instrument recovery system 200 to a cell phone 130 or other device which is connected to the public network 120. Location information can be conveyed to the cell phone or other device via the public network 120. The locational information can merely be the new or second location of the object 100 with the instrument recovery system 200, or can be a listing of locations at various times for the object 100. Given the locational data, the proper authorities can be informed of the second or new location. In some instances, the authority may be a law enforcement agency. In other instances, the authority may be the owners of the object 100.

Figure 2:
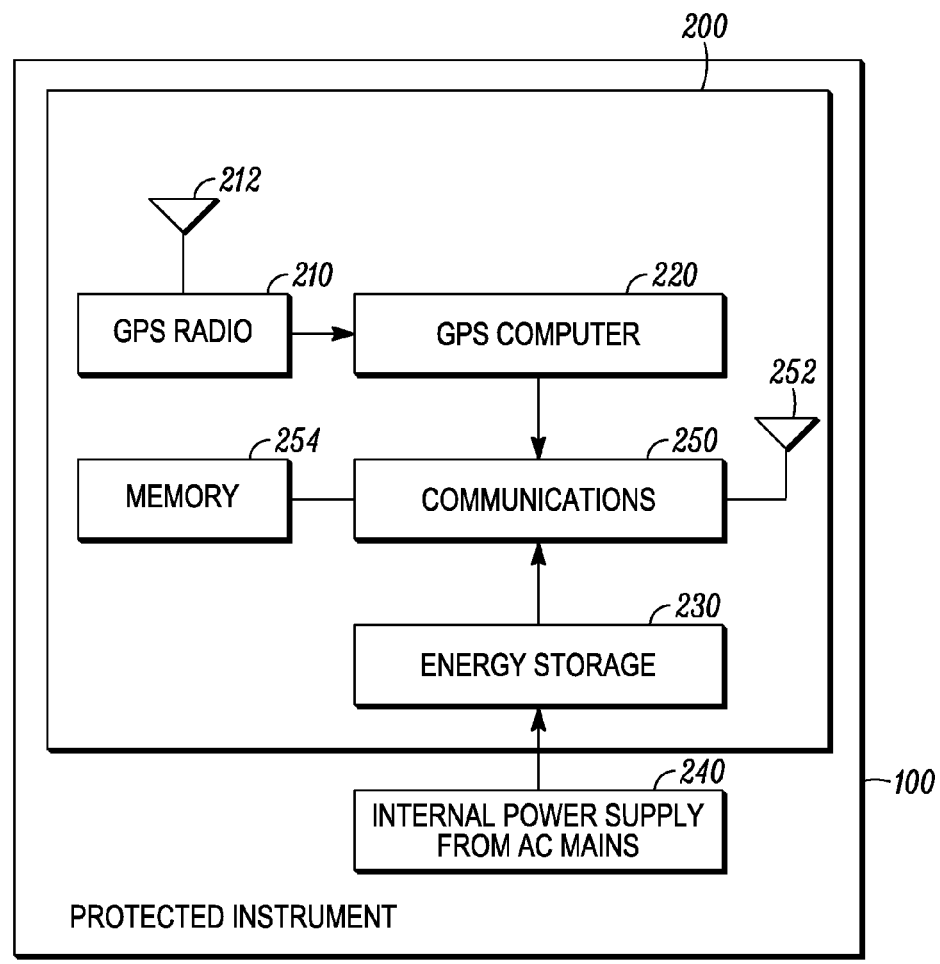
FIG. 2 is a schematic diagram of an instrument recovery system that includes components of a GPS receiver and a communications device, according to an example embodiment.

FIG. 2 is a schematic diagram of an instrument recovery system 200 that includes components of a GPS receiver 210 and a communications device 250, according to an example embodiment. The instrument recovery system 200 and the communications device 250 are formed integrally with the protected instrument or object 100. The instrument recovery system 200 includes a GPS radio receiver 210 and a GPS computer 220. The GPS radio receiver also includes an antenna 212. The antenna 212 receives signals from the various GPS satellites, such as satellites 111, 112, 113, 114 (shown in FIG. 1). The time at which the signals were sent are also received via the antennae 212. This information or data is conveyed to the GPS computer 220. The GPS computer 220 determines the time difference from a satellite and coverts the time difference to a physical distance. The physical distance from at least three satellites 111, 112, 113 can be used to locate a 2D position of the object. The physical distance from at least four satellites 111, 112, 113, 114 can be used to locate a 3D position of the object. The 3D position includes the elevation of the object 100. The GPS computer 220 uses triangulation to find the 2D or 3D position. Once the 2D or 3D information is obtained, it is communicated via the communications device 250. As shown in FIG. 1, the communications device is at least a radio sending device that can communicate with another device, such as a cell phone on a cellular network. Therefore, the communications device 250 includes at least the portions of a cell phone needed to enable a call made to a cell phone. This includes an antennae 252 and a memory 254 for holding the determined locational data. The locational data can be just the new or second location of the object 100. It could also be several locations that could be stored in the memory 254. In some embodiments, the communications device also must be able to receive a query from a network, such as a cell phone network. One query that will be made will include the location of the object or instrument in the second position. The answer to the query will include an uplink to the network 120. This will result in at least a message being left on a cell phone 130 that includes the second position of the object or instrument 100.

In the case of cellular telephone public network access, the instrument recovery system does not need to be able to originate a call. It only needs to be able to respond to a query, i.e. to receive a call. This requires only a very simplified subset of the functionality of a basic (not smart) cell phone. The visual display, audio transducers, keypad, amplifiers etc, are all not required.

Depending on the specificity (or generality) of the application of the invention, there are a number of other proprietary networks which might be contractually available or otherwise used, such as a utility load management mesh networks, a Wi-Fi hotspots, a citywide Wi-max networks and the like.

In addition, by adding the necessary sensors (accelerometers/gyroscopes) to an instrument recovery system it is possible to augment the last good GPS location with inertial navigation data from the additional sensors. The accelerometers and gyroscopes can be formed integrally with the motherboard of the object. Such enhanced GPS functionality is useful when GPS signals are lost as the object moves inside. Use of inertial navigation can be used to pinpoint possible locations. The instrument recovery system 200 also includes an energy source 230. The energy source 230 can be a rechargeable battery or the like. The energy source can be any source of energy. In this particular embodiment, the energy source 230 is communicatively coupled to another source of energy 240 so that the energy source 230 can be constantly recharged as long as the object is being used or plugged in for use. As shown in this embodiment, the other source of energy 240 is an internal power supply connected to AC mains. Other sources of energy could be a primary battery, in the case of portable equipment, or a solar cell for certain outdoor equipment. Another possible energy source is a piezoelectric energy harvesting system, such as from walking. This would be helpful in certain portable applications. Any method which powers the host equipment can also charge the instrument recovery system internal battery.

Other sources of power can also be connected to the energy storage device 230. As substitute or an alternative to a battery or internal battery, an electric double-layer capacitor (ultracapacitor) could be used. This is because such capacitors have (for practical purposes being discussed here) unlimited charge-discharge lifetime. They can be continuously charged while mains power is available and used to power the GPS device only during unavailability of the mains.

Figure 3:
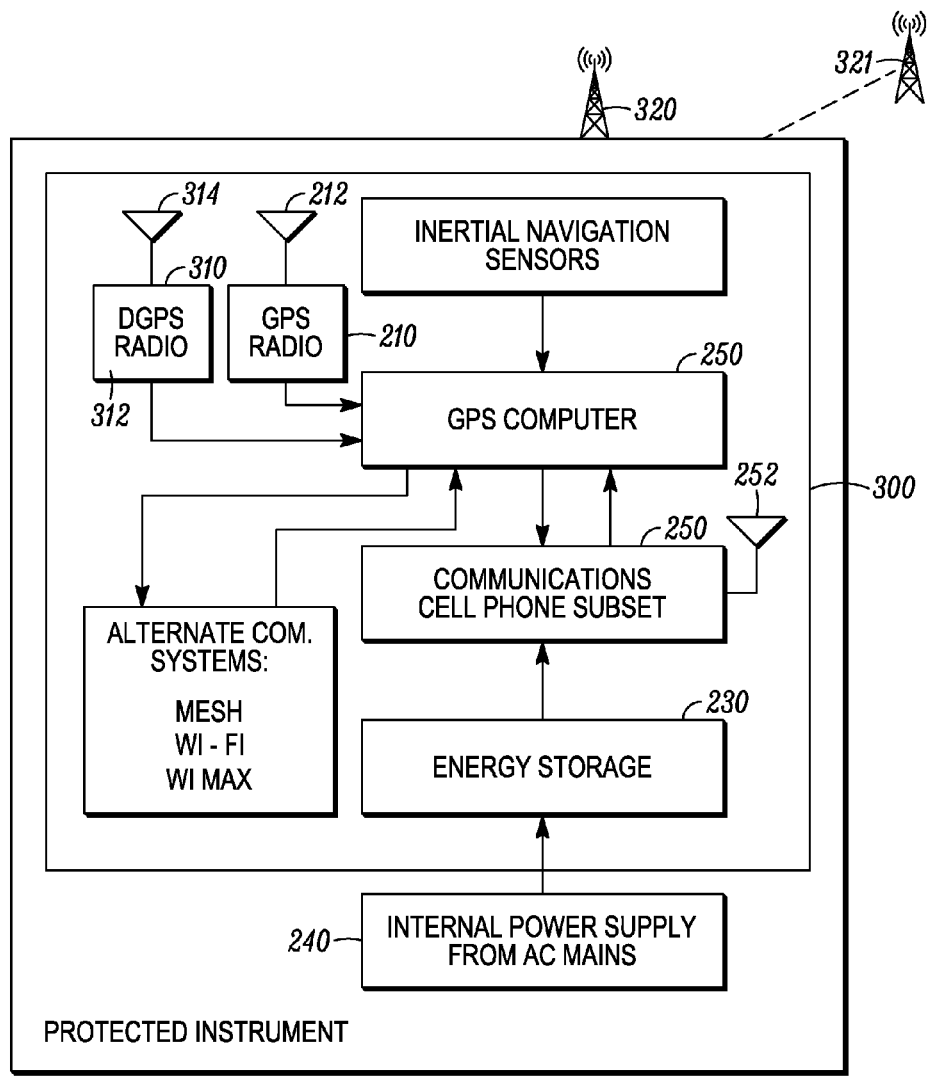
FIG. 3 is a schematic diagram of an instrument recovery system that includes components of a GPS receiver, a DGPS receiver and a communications device capable of communicating with a plurality of communications, according to an example embodiment.

FIG. 3 is a schematic diagram of an instrument recovery system 300 that includes additional components for a GPS receiver, to transform it to a Differential Global Positioning System ("DGPS") receiver 310 and a communications device 250 capable of communicating with a plurality of communications, according to an example embodiment. The GPS receiver is substantially the same as the GPS receiver 210. A Differential Global Positioning System includes transmission towers 320, 321 that correct GPS signals to within an average of three to five meters. The U.S. Coast Guard operates the most common DGPS correction service. This system includes of a network of towers that receive GPS signals and transmit a corrected signal by beacon transmitters 320, 321. In order to get the corrected signal, a UPS receiver 310 must have a differential beacon receiver 312 and beacon antenna 314 in addition to their GPS receiver. Differential GPS (DGPS) signals may be available in different areas in the future. If the GPS receiver is equipped (FIG. 3) to make use of these signals, then only one or two GPS satellites need to be available.

The instrument recovery system 300 can have a GPS receiver provided with other hardware to further increase the accuracy of the locational information. The hardware is not limited to DGPS receivers and transmission towers. For example, the GPS receiver can also be provided with other hardware that makes improves the locational ability of the GPS receiver. For example, GPS receivers with a Wide Area Augmentation System (WAAS) capability can improve accuracy to less than three meters on average. No additional equipment or fees are required to take advantage of WAAS.

Figure 4:
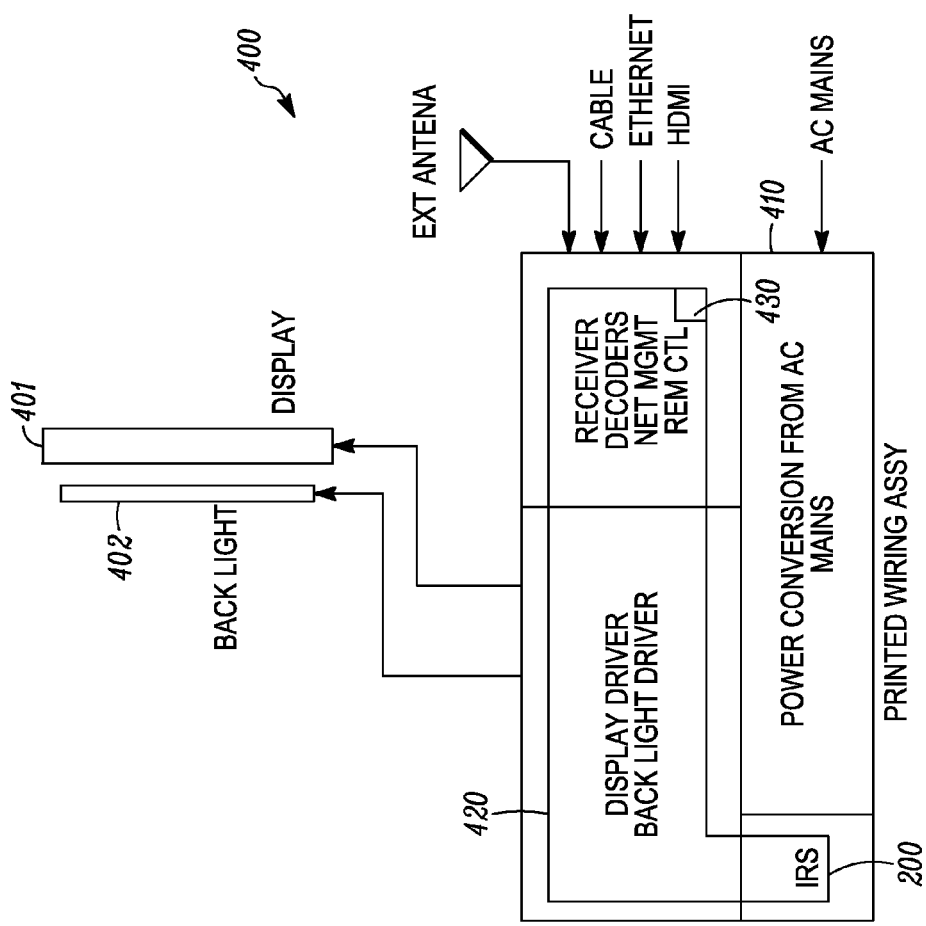
FIG. 4 is a schematic diagram of a flat screen television that includes a motherboard for operating many of the functions of the television and with includes an instrument recovery system formed integrally into the motherboard, according to an example embodiment.

FIG. 4 is a schematic diagram of a flat screen television 400 that includes a motherboard 410 for operating many of the functions of the television, according to an example embodiment. The motherboard 410 includes an instrument recovery system 200 formed integrally into the motherboard 410. The motherboard 400 includes a microprocessor 420 and memory 430 that is used by the microprocessor 420. The microprocessor decodes received information, is in charge of net management and remote control, amongst other items. The microprocessor 420 also runs the display driver and the backlight driver for a display 401 and a backlight 402. The microprocessor 420 of the television or object also conducts some of the functions of the Instrument Recovery System 200.

Thus, the locatable object (a flat panel television 400) also includes an instrument recovery system 200 integrated into the object, such as the flat panel television 400. The instrument recovery system 200 further includes a receiver (shown in FIGS. 2 and 3) for determining the location of an object, and a communications device (shown in FIGS. 2 and 3) for communicating at least the second position to another system. The instrument recovery system 200 uses at least a portion of the microprocessor 420 of the object. The communications device of the locatable object further comprises a radio, and an antenna (shown in FIGS. 2 and 3). The motherboard locatable object also includes key portions of the instrument recovery system 200 that are formed into the motherboard 410 at the time of manufacture. The motherboard includes the microprocessor, and the memory and the antenna of the communications device of the instrument recovery system 410. The components of the instrument recovery system 410 can not be disabled without causing serious damage to the function of the object 400. Simply put, trying to disable the instrument recovery system 200 will disable some or all of the functions of the object, such as the flat screen television 400. In some instances, the attempt to disable a portion of the instrument recovery system will disable the object 400. The instrument recovery system 200 is formed and integrated into the object at the time of manufacture. In another embodiment, the receiver for determining the location of the object is a differential Global Positioning System receiver. The additional hardware needed to form the DGPS receiver is also formed integral with the motherboard 410 of the object 400. Again, an attempt to disable the DGPS will seriously disable many of the features of the object, such as flat screen television 400. It should be noted that this invention is not limited to use in flat screen televisions. Objects can be any type of object including other consumer electronics, large machinery, automobiles, stereos, and the like.

Integrating the instrument recovery system 200 into the motherboard 410 of the object 400 prevents the thief from disabling the instrument recovery system 200, or stealing the objects 400 in the first place. If the thief tries to disable the instrument recovery system 200, the value of the object 400 plummets because the object 400 will be partially disabled or totally ruined. After this happens a number of times, the objects 400 having instrument recovery systems 200 built in or fully integrated into the motherboard 410 of an object will more likely be left alone as they will be less valuable. Unprotected targets will be zeroed in on.

Figure 5:
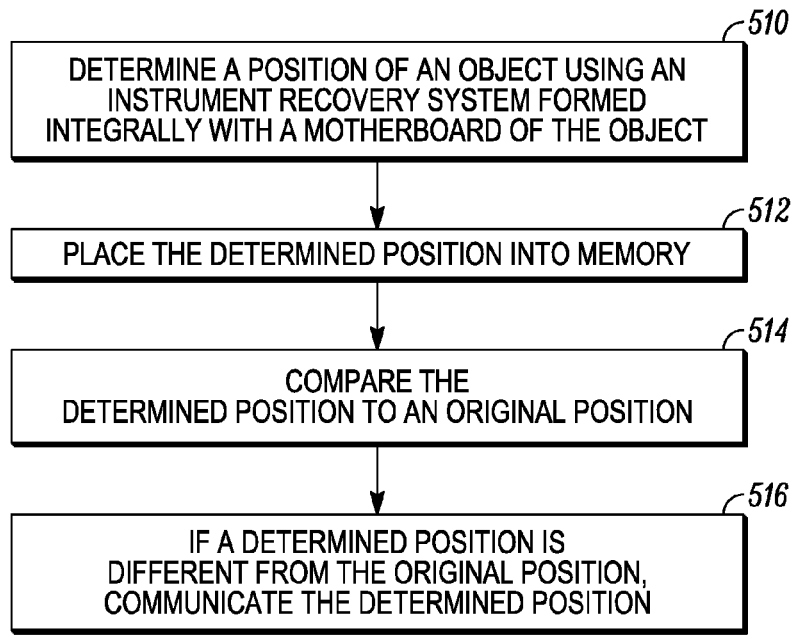
FIG. 5 is a flow diagram of a method for using an instrument recovery system, according to an example embodiment.
Figure 6:
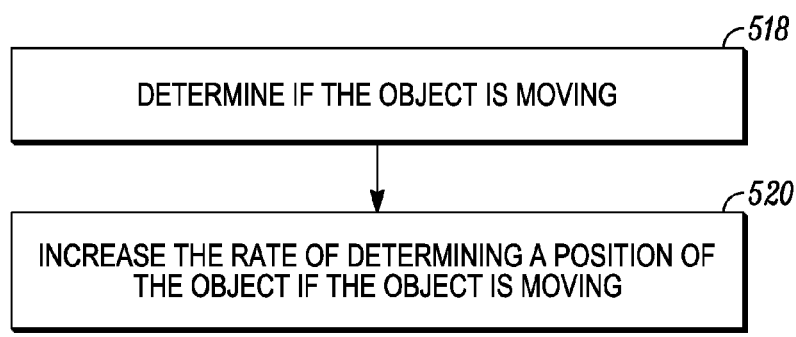
FIG. 6 is a flow diagram of an extension to the method for using an instrument recovery system, according to an example embodiment.

FIG. 5 is a flow diagram of a method 500 for using an instrument recovery system 200, according to an example embodiment. FIG. 6 is a flow diagram of an extension to the method 500 for using an instrument recovery system 200, according to an example embodiment. Now referring to both FIGS. 5 and 6, the method 500 includes determining a position of an object using an instrument recovery system formed integrally with a motherboard of the object 510, and placing the determined position into memory 512. The determined position is compared to an original position 514. If a determined position is different from the original position, the determined position is communicated 516. For example, in one embodiment, the determined position is communicated to a cell phone. In another embodiment, the cell phone responds to a query made to the cell phone. In some embodiments, the method 500 includes determining if the object is moving 518. If the object is moving, the rate of determining a position of the object is increased 520. In other embodiments, the relocated position of the object is communicated when or after the object has stopped moving. In still other embodiments, a trajectory of an object can be determined from at least two of the determined positions of the object. When the method discussed above is programmed into a memory of a general purpose computer, the computer is formed into a special purpose machine. Furthermore, when the method 500 is programmed into a memory of a general purpose computer the instructions are in the form of a non transitory set of instructions. The method 500, when run by a computer, can be termed a computerized method.

The method 500 could be run by any type of computer from a super computer to a dedicated microprocessor. In many instances, the method 500 will be run on a microprocessor. All are computing devices.

Figure 7:
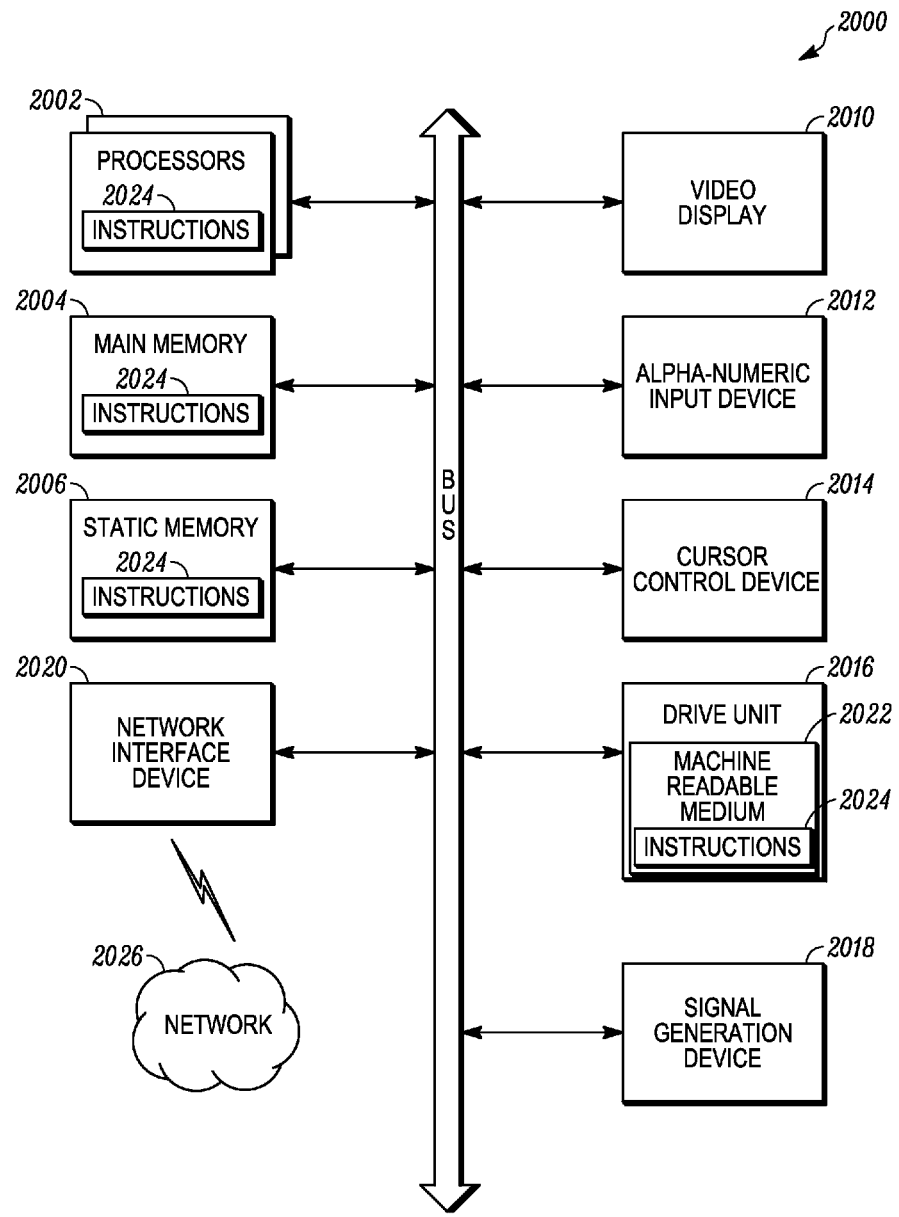
FIG. 7 shows a schematic diagram of a computer system used in the object or instrument, according to an example embodiment.

FIG. 7 shows a diagrammatic representation of a computing device for a machine in the example electronic form of a computer system 2000, within which a set of instructions for causing the machine to perform any one or more of the error correction methodologies discussed herein can be executed or is adapted to include the apparatus for error correction as described herein. In various example embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a personal computer (PC), a tablet PC, a set-top box (STB), a Personal Digital Assistant (PDA), a cellular telephone, a portable music player (e.g., a portable hard drive audio device such as a Moving Picture Experts Group Audio Layer 3 (MP3) player, a web appliance, a network router, a switch, a bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 2000 includes a processor or multiple processors 2002 (e.g., a central processing unit (CPU), a graphics processing unit (GPU), arithmetic logic unit or all), and a main memory 2004 and a static memory 2006, which communicate with each other via a bus 2008. The computer system 2000 can further include a video display unit 2010 (e.g., a liquid crystal display (LCD) or a cathode ray tube (CRT)). The computer system 2000 also includes an alphanumeric input device 2012 (e.g., a keyboard), a cursor control device 2014 (e.g., a mouse), a disk drive unit 2016, a signal generation device 2018 (e.g., a speaker) and a network interface device 2020.

The disk drive unit 2016 includes a computer-readable medium 2022 on which is stored one or more sets of instructions and data structures (e.g., instructions 2024) embodying or utilized by any one or more of the methodologies or functions described herein. The instructions 2024 can also reside, completely or at least partially, within the main memory 2004 and/or within the processors 2002 during execution thereof by the computer system 2000. The main memory 2004 and the processors 2002 also constitute machine-readable media.

The instructions 2024 can further be transmitted or received over a network 2026 via the network interface device 2020 utilizing any one of a number of well-known transfer protocols (e.g., Hyper Text Transfer Protocol (HTTP), CAN, Serial, or Modbus).

While the computer-readable medium 2022 is shown in an example embodiment to be a single medium, the term "computer-readable medium" should be taken to include a single medium or multiple media (e.g., a centralized or distributed database, and/or associated caches and servers) that store the one or more sets of instructions and provide the instructions in a computer readable form. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, tangible forms and signals that can be read or sensed by a computer. Such media can also include, without limitation, hard disks, floppy disks, flash memory cards, digital video disks, random access memory (RAMs), read only memory (ROMs), and the like.

The example embodiments discussed above are not all inclusive. It should be pointed out that there are many possible variations that can be implemented in a number of other embodiments. Just a few other example embodiments are set forth here:

A system to aid in the location of lost or stolen property which system is embedded in said property either at the time of manufacture or subsequently. As mentioned above, such a system can include a Global Positioning System radio, antenna and computer. Additionally, sensors and computational capability can be used for inertial navigation. In some embodiments, the instrument recovery system could include GPS equipment that includes a Differential GPS receiver, antenna and the required computational capability.

The system can include a communication apparatus having a subset of cellular telephone functionality sufficient to allow the system to be queried via the cellular network. The system can include a Wi-Fi interface to allow the system to be queried via a local area wireless network which may be interconnected to the public switched telephone network. The system can also include a mesh network node for the purpose of being queried via a utility load management network or similar mesh network. In still another embodiment, the system could also include a Wi-Max interface to allow being queried via a municipal or other wide-area network.

The system can also have an energy storage device, such as a battery or rechargeable battery. The power for recharging the battery can be obtained directly from the AC mains, or an internal power supply of the apparatus. An alternative to the battery can be an electric double-layer capacitor, also known as a "supercapacitor" or "ultracapacitor". Such a capacitor can obtain recharging power from many of the same charging sources as the rechargeable battery.

The strength of the invention disclosed above is its simplicity. The instrument recovery system is not a system to pre-emptively deter theft, nor to notify anyone that a theft has occurred, nor to disable the operation of anything. Rather, we assume that if something is stolen and it matters, the party from whom it was stolen will notice that fact. Having noticed, the affected party or the appropriate authorities will be able to determine the whereabouts of the object preliminary to recovering it.

The example embodiments described herein can be implemented in an operating environment comprising computer-executable instructions (e.g., software) installed on a computer, in hardware, or in a combination of software and hardware. Modules as used herein can be hardware or hardware including circuitry to execute instructions. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method(s) can be written in any number of suitable programming languages such as, for example, Hyper text Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Perl, UNIX Shell, Visual Basic or Visual Basic Script, Virtual Reality Markup Language (VRML), ColdFusion™ or other compilers, assemblers, interpreters or other computer languages or platforms.

In summary, a locatable object includes a microprocessor for operating the object, and a memory for storing at least a first position and a second position. The locatable object also includes an instrument recovery system integrated into the object. The instrument recovery system further includes a receiver for determining the location of an object, and a communications device for communicating at least the second position to another system. In one embodiment, the instrument recovery system uses at least a portion of the microprocessor of the object. In another embodiment, the instrument recovery system includes a second microprocessor. The communications device of the locatable object further comprises a radio, and an antenna. The locatable object also has a motherboard. The motherboard includes the microprocessor, the memory and the instrument recovery system, the antenna of the communications device incapable of being disabled without disabling the motherboard. In other words, the components of the instrument recovery system can not be disabled without causing serious damage to the function of the object. In some instances, the attempt to disable a portion of the instrument recovery system will disable the object. In one embodiment, the instrument recovery system is formed and integrated into the object at the time of manufacture. In another embodiment, the motherboard includes the microprocessor, the memory and the instrument recovery system. The instrument recovery system incapable of being disabled without disabling the motherboard. The receiver for determining the location of the object is a Global Positioning System receiver. In another embodiment, the receiver for determining the location of the object is a differential Global Positioning System receiver.

The communications device for communicating at least the second position delivers a message to a cell phone. The communications device for communicating at least the second position delivers a message to a network, in one embodiment. The network can be a wide area network, a local area network, a mesh network, a wireless network, or the like. In other words, the communications device should be able to connect and communicate with a network and the network is not limited to those listed above. It should be noted that the communications device could connect to other networks and furthermore, that the communications device, in some embodiments, can be able to communicate with more than one other network or device. In still further embodiments, the communications device can include at least a portion of hardware so that the communications device can respond to queries made to the object and more specifically to the communications device associated with the object. In the alternative, the rechargeable battery obtains energy from an internal power supply of the object or apparatus in which the invention is installed. In another embodiment, the energy store includes an electric double-layer capacitor, also known as a "supercapacitor" or "ultra-capacitor". In still another embodiment, the recharging power for the battery can be obtained from the internal power supply of the apparatus or object in which the invention is installed.

A machine-readable medium providing instructions that, when executed by a machine, cause the machine to perform operations include determining a position of an object using an instrument recovery system formed integrally with a motherboard of the object, and placing the determined position into memory. The determined position is compared to an original position and, if different the determined position is communicated.

In one embodiment, the location of the protected device is determined and stored and made available upon inquiry through a communications network. In some embodiments, an object or product does not have to be registered.

This has been a detailed description of some exemplary embodiments of the invention(s) contained within the disclosed subject matter. Such invention(s) may be referred to, individually and/or collectively, herein by the term "invention" merely for convenience and without intending to limit the scope of this application to any single invention or inventive concept if more than one is in fact disclosed. The detailed description refers to the accompanying drawings that form a part hereof and which shows by way of illustration, but not of limitation, some specific embodiments of the invention, including a preferred embodiment. These embodiments are described in sufficient detail to enable those of ordinary skill in the art to understand and implement the inventive subject matter. Other embodiments may be utilized and changes may be made without departing from the scope of the inventive subject matter. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed:

1. A locatable host object comprising:
a microprocessor for operating the locatable host object;
a memory for storing at least a first position and a second position;
an instrument recovery system integrated into the locatable host object, the instrument recovery system further comprising:
a receiver for determining the location of an object;
a communications device for communicating at least the second position to another system; and
at least one sensor for inertial navigation for determining a position from a last known position from the receiver, the microprocessor, the memory and the instrument recovery system located on a motherboard of the locatable host object.

2. The locatable object of claim 1 wherein the instrument recovery system uses at least a portion of the microprocessor of the locatable host object.

3. The locatable object of claim 1 wherein the instrument recovery system includes a second microprocessor.

4. The locatable object of claim 1 wherein the communications device further comprises:
 a radio; and
 an antenna.

5. The locatable object of claim 4 wherein the antenna of the communications device is incapable of being disabled without disabling the motherboard.

6. The locatable object of claim 1 wherein the at least one sensor includes an accelerometer.

7. The locatable object of claim 1 wherein the receiver for determining the location of the object is a Global Positioning System receiver.

8. The locatable object of claim 1 wherein the receiver for determining the location of the object is a differential Global Positioning System receiver.

9. The locatable object of claim 1 wherein the communications device for communicating at least the second position delivers a message to a cell phone.

10. The locatable object of claim 1 wherein the communications device for communicating at least the second position delivers a message to a network.

11. The locatable object of claim 1 further comprising an energy store in the form of a rechargeable battery.

12. The locatable object of claim 11 wherein the rechargeable battery obtains energy from an AC mains.

13. The locatable object of claim 1 further comprising an energy store in the form of a ultracapacitor.

14. A locatable host object comprising:
 a microprocessor for operating the locatable host object;
 a memory for storing at least a first position and a second position;
 an instrument recovery system integrated into the microprocessor for the locatable host object, the instrument recovery system further comprising:
  a receiver for determining the location of an object; and
  a communications device for communicating at least the second position to another system in response to an inquiry signal received by the receiver.

15. The locatable host object of claim 14 further comprising an energy store for providing energy to the instrument recovery system.

16. The locatable host object of claim 14 wherein the energy store includes a piezoelectric energy harvesting system.

17. The locatable host object of claim 14 wherein the energy store includes a solar cell.

* * * * *